US009172950B2

(12) United States Patent
Pham et al.

(10) Patent No.: US 9,172,950 B2
(45) Date of Patent: *Oct. 27, 2015

(54) METHOD AND SYSTEM USING AUTOMATED WORKFLOW FOR MONITORING OF VIDEO ASSETS

(75) Inventors: Hung John Pham, Cedar Park, TX (US); John Clayton Clark, IV, Austin, TX (US); Shane Michael Elliott, Fort Worth, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 772 days.

This patent is subject to a terminal disclaimer.

(21) Appl. No.: 12/958,688

(22) Filed: Dec. 2, 2010

(65) Prior Publication Data

US 2012/0144410 A1 Jun. 7, 2012

(51) Int. Cl.
*H04N 17/00* (2006.01)
*H04N 17/04* (2006.01)
*H04N 21/61* (2011.01)
*H04N 21/65* (2011.01)
*H04H 60/31* (2008.01)

(52) U.S. Cl.
CPC .............. *H04N 17/00* (2013.01); *H04H 60/31* (2013.01); *H04N 17/04* (2013.01); *H04N 21/6118* (2013.01); *H04N 21/6168* (2013.01); *H04N 21/65* (2013.01)

(58) Field of Classification Search
USPC .......................................... 725/107; 348/192
See application file for complete search history.

(56) References Cited

U.S. PATENT DOCUMENTS

| 6,965,895 | B2 | 11/2005 | Smith et al. |
| 7,592,912 | B2 | 9/2009 | Hasek et al. |
| 7,688,754 | B2 | 3/2010 | Williams |
| 7,693,081 | B1 | 4/2010 | Zriny et al. |
| 7,826,383 | B2 | 11/2010 | Savard et al. |
| 2003/0061212 | A1 | 3/2003 | Smith et al. |
| 2005/0183130 | A1* | 8/2005 | Sadja et al. ................... 725/107 |
| 2007/0047542 | A1* | 3/2007 | Thukral ....................... 370/389 |
| 2009/0064251 | A1 | 3/2009 | Savoor et al. |
| 2009/0100492 | A1 | 4/2009 | Hicks, III et al. |
| 2009/0106809 | A1 | 4/2009 | Rahman |
| 2009/0168658 | A1 | 7/2009 | Russell et al. |
| 2010/0150018 | A1 | 6/2010 | Beattie, Jr. et al. |
| 2010/0271488 | A1 | 10/2010 | Garcia et al. |
| 2011/0088070 | A1 | 4/2011 | Pham et al. |
| 2011/0090346 | A1 | 4/2011 | Pham et al. |

* cited by examiner

Primary Examiner — Jun Fei Zhong
(74) Attorney, Agent, or Firm — Jackson Walker L.L.P.

(57) ABSTRACT

A method and system for monitoring video assets provided by a multimedia content distribution network (MCDN) includes an expert test monitoring platform (ETMP) configured to emulate MCDN client systems at a facility of an MCDN service provider. The ETMP may allow execution of ETMP scripts that specify remote control commands to send to a desired plurality of multimedia handling devices representing emulated MCDN clients. The ETMP scripts may be manually or automatically initiated and may be configured with execution parameters specifying, among other aspects, a number of iterations to repeat. Results recorded when the ETMP script executes may be retrieved and used to generate reports.

19 Claims, 7 Drawing Sheets

METHOD AND SYSTEM USING AUTOMATED WORKFLOW FOR MONITORING OF VIDEO ASSETS

FIELD OF THE DISCLOSURE

The present disclosure relates to baseband video monitoring, and in particular to automated monitoring of baseband video assets.

BACKGROUND

Users of a multimedia content distribution network (MCDN) may be provided a wide range of video assets to select from. A service provider operating the MCDN may be faced with various quality control issues related to the video assets and the performance of MCDN equipment.

DETAILED DESCRIPTION

In one aspect, a disclosed method for monitoring a multimedia content distribution network (MCDN) includes selecting, based on a first received user input, at least one multimedia handling device (MHD) included in a plurality of MHDs installed in an expert test monitoring platform (ETMP) coupled to the MCDN. The method may also include selecting, based on a second received user input, an ETMP script, including a plurality of MHD commands and configuring, based on a third received user input, execution parameters for the selected ETMP script. The method may further include executing the selected ETMP script substantially simultaneously on the selected MHDs according to the execution parameters. The execution parameters may specify a number of iterations to repeat the selected ETMP script, a storage location for recording outcomes of the selected ETMP script, responses to MHD errors occurring during execution of the selected ETMP script, or a combination thereof. The MHD may be configured to generate multimedia output, including an MCDN program channel, a video-on-demand (VOD) program, a pay-per-view (PPV) program, a previously recorded program, Internet content, an MCDN user logon screen, an electronic program guide (EPG) screen, a program information screen, a VOD menu screen, and a PPV menu screen. The responses to MHD errors may include a reset response that may include selectively restarting an erroneous MHD using a network-based power controller to cycle power off and on to the erroneous MHD.

In certain embodiments, the method operation of configuring of the execution parameters may further include configuring first execution parameters for a first selected MHD, and configuring second execution parameters for a second selected MHD, while the first execution parameters may be different from the second execution parameters. The ETMP script may specify remote control commands for execution on the selected MHDs. The method operation of executing the selected ETMP script may include initiating, based on fourth received user input, automatic execution of the selected ETMP script. The fourth user input further may specify a scheduled start time for the selected ETMP script, while the method further includes initiating automatic execution of the selected ETMP script at the scheduled start time. The selected ETMP script may be stored at an ETMP database, while the method may still further include retrieving the selected ETMP script from the ETMP database.

In a further aspect, a disclosed computerized test system for monitoring output channels from an MCDN includes a processor coupled to memory media and a network adapter accessible to the processor. The memory media may further include instructions to select at least one MHD in an ETMP, while the ETMP may further include a plurality of MHDs configured to output MCDN program channels, an ETMP network coupled to the network adapter, and a network-based remote control unit configured to control individual ETMP MHDs in response to remote control commands received via the ETMP network. The memory media may further include instructions to retrieve an ETMP script that may specify MHD remote control commands, and execute the ETMP script, including sending the MHD remote control commands to the selected MHDs.

In certain embodiments, the instructions to retrieve the ETMP script may include instructions to identify a user requesting the ETMP script, and validate the identified user as authorized to access the ETMP script. The memory media may include instructions to initiate automatic execution of the ETMP script. The memory media may further include instructions to identify a scheduled start time for the ETMP script, while the instructions to initiate automatic execution may include instructions to initiate the automatic execution at the scheduled start time. The instructions to retrieve the ETMP script may include instructions to retrieve the ETMP script from an ETMP database accessible to the test system.

In yet another aspect, an ETMP for monitoring output channels from an MCDN includes a plurality of addressable ports operable to connect to a respective plurality of MHDs configurable and individually selectable as units under test (UUTs) and configured to output MCDN channels. The ETMP may include an ETMP configurator configured to select a plurality of UUT(s) from among the plurality of MHDs, retrieve an ETMP script specifying remote control commands for controlling the plurality of UUTs, and execute the ETMP script to send remote control commands to the plurality of UUTs. The remote control commands may cause the UUT to present multimedia output that may include an MCDN program channel, a VOD program, a PPV program, a previously recorded program, Internet content, an MCDN user logon screen, an EPG screen, a program information screen, a VOD menu screen, a PPV menu screen, or any combination thereof.

In some embodiments, the ETMP configurator may be configured to specify execution parameters for the ETMP script. The execution parameters may indicate a number of iterations to repeat the retrieved ETMP script, a storage location for recording results of the retrieved ETMP script, responses to UUT errors occurring during execution of the retrieved ETMP script, or a combination thereof, among other execution parameters. The ETMP configurator may also be configured to record results of executing the retrieved ETMP script, and generate a report based on the recorded results. The report may include statistics for different iterations of the retrieved ETMP script, statistics for different UUTs executing the retrieved ETMP script, errors reported by UUTs executing the retrieved ETMP script, status indications for UUTs executing the retrieved ETMP script, performance indications for UUTs executing the retrieved ETMP script, or various combinations thereof.

In given embodiments, the ETMP configurator may be configured to configure first execution parameters for a first selected UUT, and configure second execution parameters for a second selected UUT, while the first execution parameters may be different from the second execution parameters. The responses to UUT errors may include a reset response that includes the ETMP selectively restarting an erroneous UUT using a network-based power controller to cycle power off and on to the erroneous UUT. The ETMP configurator may further be configured to identify a user associated with the ETMP script, and validate the identified user as authorized to access the ETMP script.

In certain embodiments, the ETMP may include an ETMP database for storing the ETMP script, and an ETMP network configured to communicatively couple at least the MHDs, the ETMP configurator(s), and the ETMP database. The ETMP may further include a power controller communicatively coupled to the ETMP network for controlling power supplied to the selected UUT(s) in response to receiving a network power control command, and a remote controller communicatively coupled to the ETMP network for selecting an MCDN channel in response to receiving a channel selection command. The ETMP may still further include a video matrix switch communicatively coupled to the ETMP network. The video matrix switch may be configured to, in response to receiving a network video switch command, selectively switch a plurality of baseband signals output by the MHDs to any one or more of a plurality of frame acquirer inputs associated with the at least one ETMP configurator.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
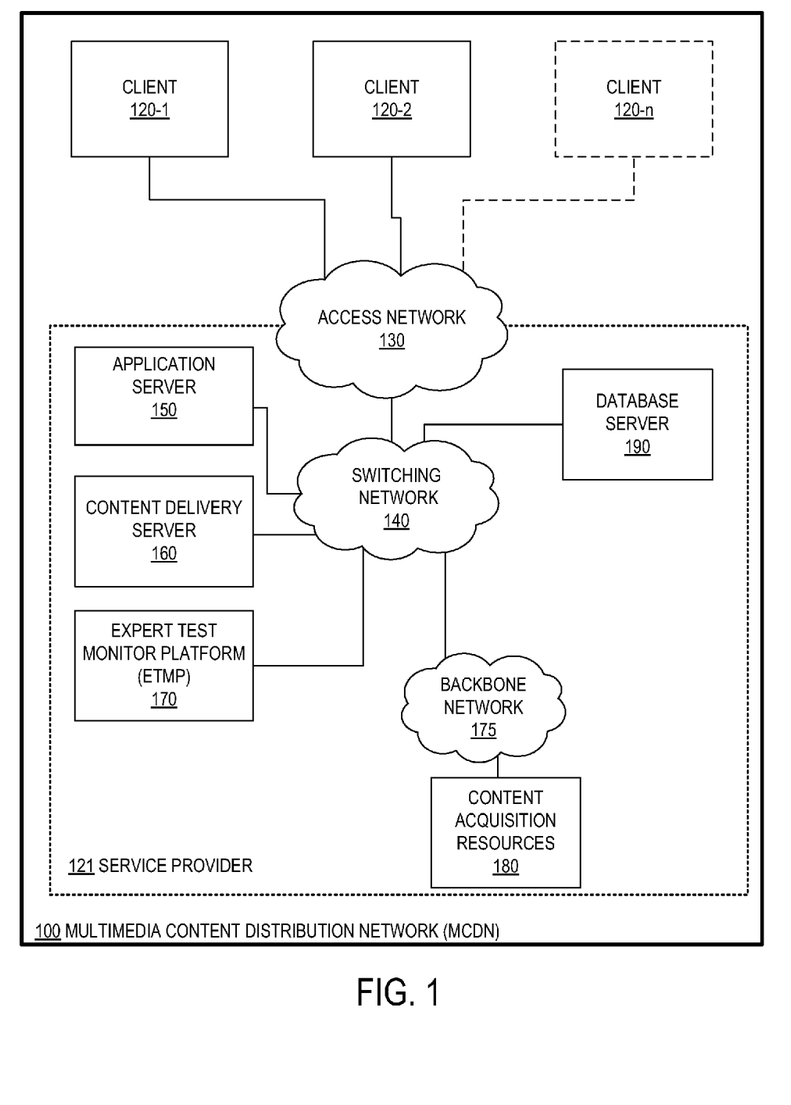
FIG. 1 is a block diagram of selected elements of an embodiment of an MCDN.

Turning now to the drawings, FIG. 1 is a block diagram illustrating selected elements of an embodiment of an MCDN 100 including ETMP 170, which may be used for monitoring an output channel from MCDN 100 and to capture user commands during testing, as will be described in detail herein. Although multimedia content is not limited to television (TV), VOD, or PPV programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 175, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital connections between clients 120 and a node (see also FIG. 4) in access network 130 while fiber, cable or another broadband medium connects service provider resources to the node. In other embodiments, the broadband cable may extend all the way to clients 120. In certain embodiments, fiber optic cables may be provided from the node in access network 130 to each individual client 120. The connections between access network 130 and clients 120 may include digital subscriber line (DSL) connections. In particular embodiments, the connections may be DSL-compliant twisted pair or another type of galvanic loop (see also FIG. 4).

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL-compliant connections, switching network 140 and/or access network 130 may include elements of a DSL access multiplexer (DSLAM) that multiplexes many subscriber DSLs to backbone network 175 (see also FIG. 4).

In FIG. 1, backbone network 175 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an EPG, such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 175 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include various applications (not shown in FIG. 1) that may provide functionality to clients 120.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote control devices, identifiers for peripheral devices, etc.

Also shown in FIG. 1 is ETMP 170, which represents a facility for test monitoring of output channels of MCDN 100. ETMP 170 may include infrastructure for emulating functionality associated with clients 120 for the purpose of capturing and analyzing output video and/or audio signals in order to test the performance and quality of video assets provided by MCDN 100 (see also FIG. 2).

It is noted that clients 120 may include network appliances collectively referred to herein as customer premises equipment (CPE). In various embodiments, CPE may include the following devices: a gateway (GW), an MHD (see also FIG. 3), and a display device (not shown in FIG. 1). Any combination of the GW, the MHD, and the display device may be integrated into a single physical device. Thus, for example, CPE might include a single physical device that integrates the GW, MHD, and a display device. As another example, an MHD may be integrated into a display device, while the GW may be housed within a physically separate device.

The GW may provide connectivity for client 120 to access network 130. The GW may provide an interface and conversion function between access network 130 and a client-side local area network (LAN). The GW may include elements of a conventional DSL or cable modem. In some embodiments, the GW may further include routing functionality for routing multimedia content, conventional data content, or a combination of both in compliance with IP or another network layer protocol. In some embodiments, the LAN may encompass or represent an IEEE 802.3 (Ethernet) LAN, an IEEE 802.11-type (WiFi) LAN, or a combination thereof. The GW may still further include WiFi or another type of wireless access point to extend the LAN to wireless-capable devices in proximity to the GW. The GW may also provide a firewall (not depicted) between clients 120 and access network 130.

Clients 120 may further include a display device or, more simply, a display (not shown in FIG. 1). The display may be implemented as a TV, a liquid crystal display screen, a computer monitor, or the like. The display may comply with a display standard for computer monitors and/or TV displays. Standards for computer monitors include analog standards such as video graphics array (VGA), extended graphics array (XGA), etc., or digital standards such as digital visual interface (DVI) and high definition multimedia interface (HDMI), among others. A TV display may comply with standards such as National Television System Committee (NTSC), Phase Alternating Line (PAL), or another suitable standard. The display may include one or more integrated speakers to play audio content.

Clients 120 may further include respective remote control (not shown in FIG. 1), which is configured to control the operation of MHD by means of a user interface, such as EPG 316 (see FIG. 3) that may be displayed by the display. The remote control of client 120 may be operable to communicate requests or commands wirelessly to the MHD using infrared (IR) or radio frequency (RF) signals. MHDs may also receive requests or commands via buttons located on side panels of MHDs.

The MHD may be enabled and configured to process incoming multimedia signals to produce audio and visual signals suitable for delivery to the display and any optional external speakers. Incoming multimedia signals received by the MHD may be compressed and/or encrypted, digital or analog, packetized for delivery over packet-switched embodiments of access network 130 or modulated for delivery over cable-based access networks. In some embodiments, the MHD may be implemented as a stand-alone set top box suitable for use in a co-axial or IP-based MCDN.

Figure 2:
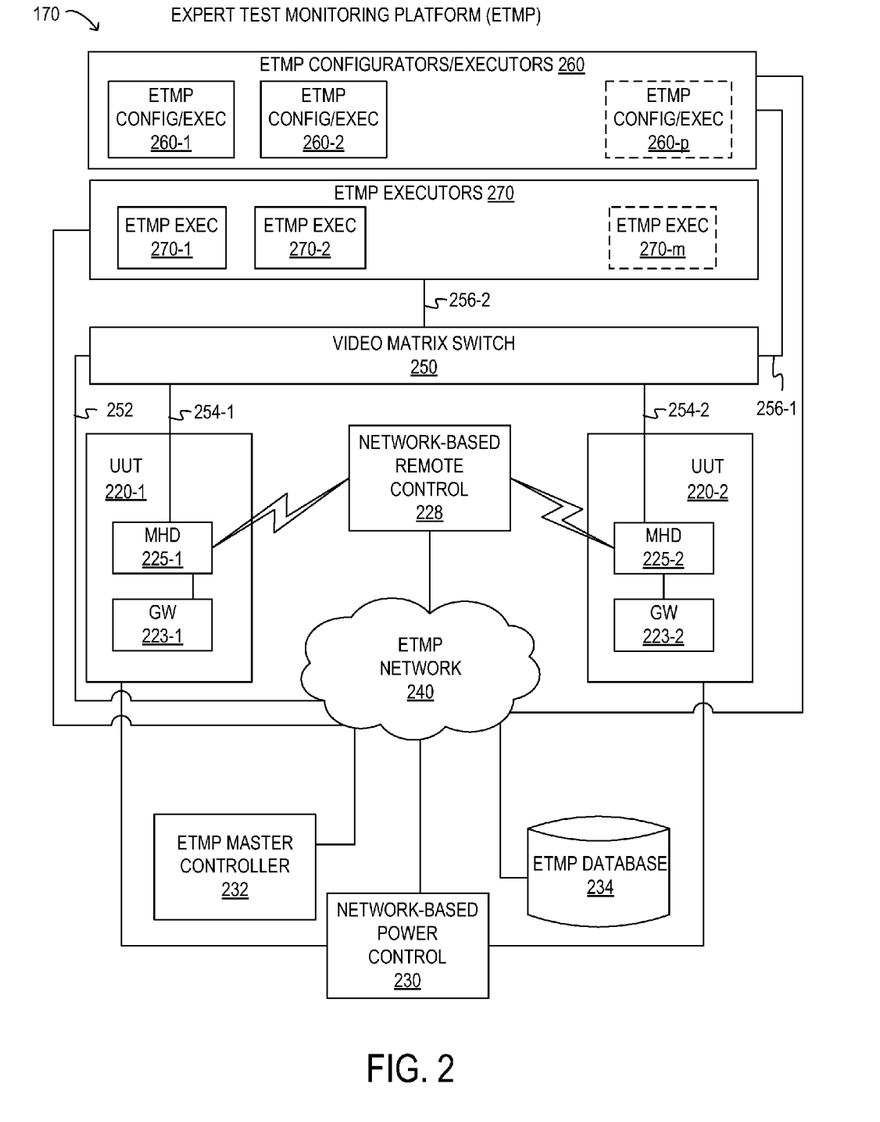
FIG. 2 is a block diagram of selected elements of an embodiment of an expert test monitoring platform (ETMP)

Referring now to FIG. 2, a block diagram illustrating selected elements of an embodiment of ETMP 170 is presented. The embodiment depicted in FIG. 2 is an exemplary implementation of ETMP 170 for illustrative purposes. It will be understood that, in different embodiments, elements depicted in FIG. 2 may be modified, rearranged, and/or omitted. For example, in certain embodiments, ETMP network 240 may refer to portions of a larger, external network system (not shown in FIG. 2). In various embodiments, video matrix switch 250 may represent either an automatic switch or a manual switch or a combination thereof. Other substitutions may be implemented in given embodiments of ETMP 170, as desired.

In FIG. 2, ETMP network 240 is shown providing communication links between various elements in ETMP 170, as will now be described in detail. It is noted that ETMP network 240 may also link ETMP 170 to switching network 140 (not shown in FIG. 2, see FIG. 1). Also shown in FIG. 2 are UUTs 220, which may represent similar elements as CPE associated with clients 120, as described previously. In FIG. 1, UUT 220-1 and 220-2 are shown as two exemplary instances for clarity, while it will be understood that ETMP 170 may include different numbers of UUT 220 in various embodiments. UUT 220 may represent an embodiment of client 120 that is implemented in ETMP 170 for the purposes of testing and analyzing output channels of MCDN 100. Accordingly, UUT 220 may provide similar functionality as client 120, but may omit certain elements that are not relevant for testing purposes (see also FIG. 3). For example, UUT 220 may not include a display. In FIG. 2, UUT 220-1 may include MHD 225-1 and GW 223-1, as described previously (see also FIG. 3), while UUT 220-2 may include MHD 225-2 and GW 223-2.

As depicted in FIG. 2, network-based remote control 228 may represent a means to generate remote control signals for reception by MHD 225. Network-based remote control 228 may be configured to receive network commands that are addressed to a specific remote control port (not shown in FIG. 2) associated with a particular MHD 225, such as MHD 225-1. In this manner, network-based remote control 228 may provide functionality to emulate a remote control operated by a user of client 120 (see FIG. 1). Network commands sent to network-based remote control 228 may originate from a test operator of ETMP 170 or from an ETMP test program that is configured to execute in an automated manner.

Also shown in FIG. 2, network-based power control 230 may represent a means to control (i.e., switch) power to UUT 220, including to MHD 225, GW 223, and/or other elements. Network-based power control 230 may be configured to receive network commands that are addressed to a specific power circuit associated with a particular UUT 220. In this manner, network-based power control 230 may provide programmable switching capability to power down and power up UUT 220 and associated elements. Network commands sent to network-based power control 230 may originate from a test operator of ETMP 170 or from an ETMP test program, as will be described in detail below.

On the operational side of ETMP 170 in FIG. 2 are ETMP configurators/executors 260 and ETMP executors 270. A "configurator" refers to a module that allows an operator (not shown in FIG. 2) to perform individual test operations, generate test sequences, obtain test results, and otherwise manually operate a test facility. An ETMP configurator is therefore specific to ETMP 170. An "executor" refers to a module that is configured to execute previously stored test sequences, also referred to as test programs, jobs, batch files, scripts, etc., comprised of individual test operations or test instructions. An ETMP executor is specific to ETMP 170. ETMP configurators/executors 260 represent configurator modules that are executable on a computing device coupled to ETMP 170, which also may include executor functionality. ETMP executors 270 represent executor modules that do not include configurator functionality. ETMP 170 may include ETMP configurators/executors 260-1, 260-2 and so on, up to an arbitrary p-number of ETMP configurators/executors 260-$p$. ETMP 170 may include ETMP executors 270-1, 270-2 and so on, up to an arbitrary m-number of ETMP executors 270-$m$.

Additionally, in FIG. 2, video matrix switch 250 is shown providing connectivity between MHDs 225 and ETMP configurators/executors 260 and ETMP executors 270. Video matrix switch 250 may receive network commands via link 252 to ETMP network 240. Video matrix switch 250 may couple to output baseband video signals from MHD 225 via links 254. Specifically, video matrix switch 250 may receive an output signal from MHD 225-1 via link 254-1 and from MHD 225-2 via link 254-2. Furthermore, video matrix switch 250 may be coupled to inputs of ETMP configurators/executors 260 via link 256-1 and to inputs of ETMP executors 270 via link 256-2. It is noted that links 256 may represent multiple connections that form one edge of a switching matrix, while links 254 represent another edge of the switching matrix. It is further noted that link 254 may represent a communication port, such as an addressable network port, that is operable to connect to MHD 225.

Also shown in FIG. 2 is ETMP master controller 232, which represents a functional module configured to manage access to resources of ETMP 170. ETMP master controller 232 may be configured to receive control requests for access to ETMP resources (such as UUTs 220 and associated elements in ETMP 170) from ETMP configurators or executors. For example, ETMP executor 270-1 may send a control request for access to UUT 220-2 from ETMP master controller 232, which may then grant the control request and assign control to ETMP executor 270-1. Subsequent requests for access to UUT 220-2 may then be denied by ETMP master controller 232, so long as ETMP executor 270-1 is assigned control of UUT 220-2. In certain embodiments, ETMP master controller 232 may take a priority of an ETMP test program into consideration when granting control requests to access ETMP resources and may terminate a currently assigned control relationship in favor of a higher priority one. In one embodiment, a scheduled ETMP test program may be assigned to ETMP executor 270-2 when a scheduled start time approaches the current time. The scheduled ETMP test program may be designated for UUT 220-2, which may be assigned for control by ETMP configurator/executor 260-1. In such an instance, ETMP master controller 232 may be configured to reassign control of UUT 220-2 to ETMP executor 270-2 and terminate the assignment of ETMP configurator/executor 260-1. A user of ETMP configurator/executor 260-1 may be given a warning by ETMP master controller 232 that a scheduled test is about to begin on UUT 220-2 and that a presently active test session will soon be terminated.

Finally, in FIG. 2, ETMP database 234 may represent a repository for data and information associated with ETMP 170. For example, ETMP database 234 may store configuration information representing ETMP resources, including network addresses and connection information for UUTs 220, video matrix switch 250, ETMP configurators/executors 260, ETMP executors 270, network-based remote control 228 and network-based power control 230. In various embodiments, ETMP master controller 232 may query ETMP database 234 for such information when managing control requests for ETMP resources. ETMP database 234 may further store ETMP test programs, as well as results of executed ETMP test programs and test operations. It is noted that various other elements in ETMP 170 may be configured to access ETMP database 234, as desired.

Figure 3:
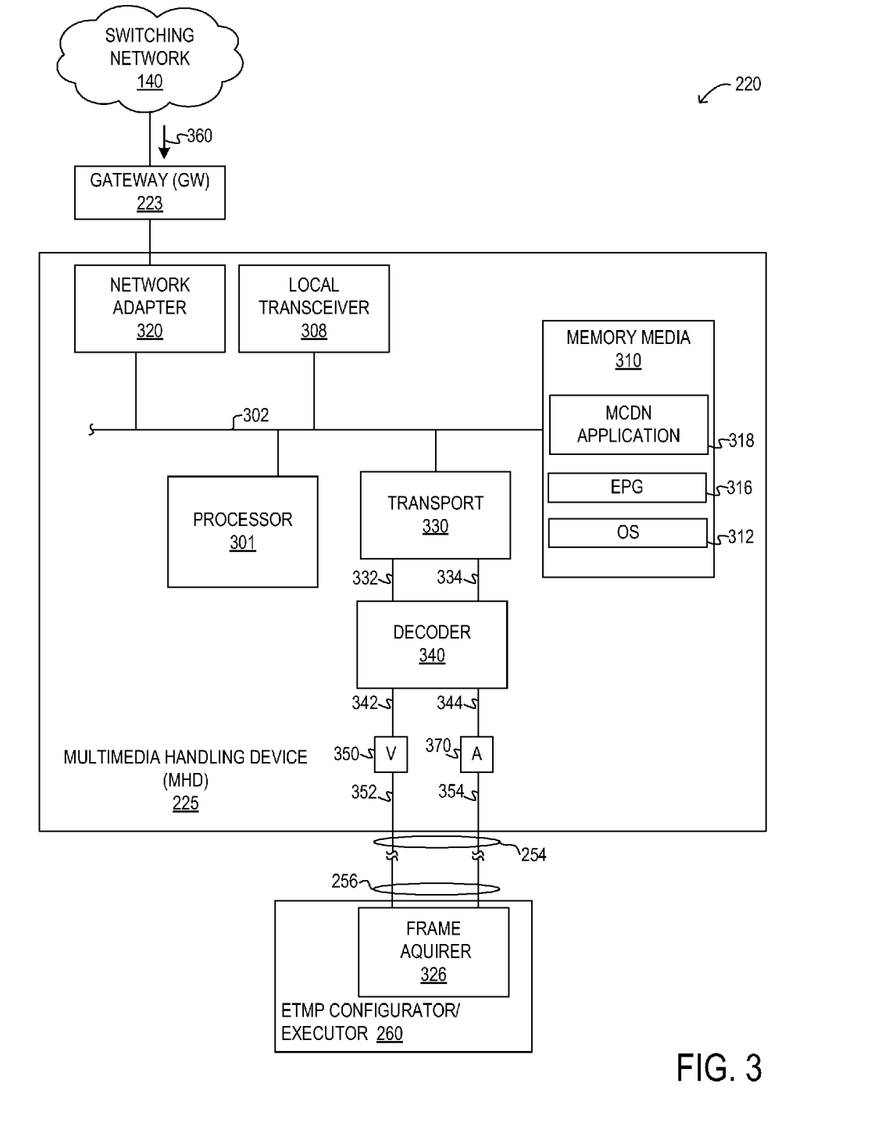
FIG. 3 is a block diagram of selected elements of an embodiment of a multimedia handling device (MHD)
Figure 4:
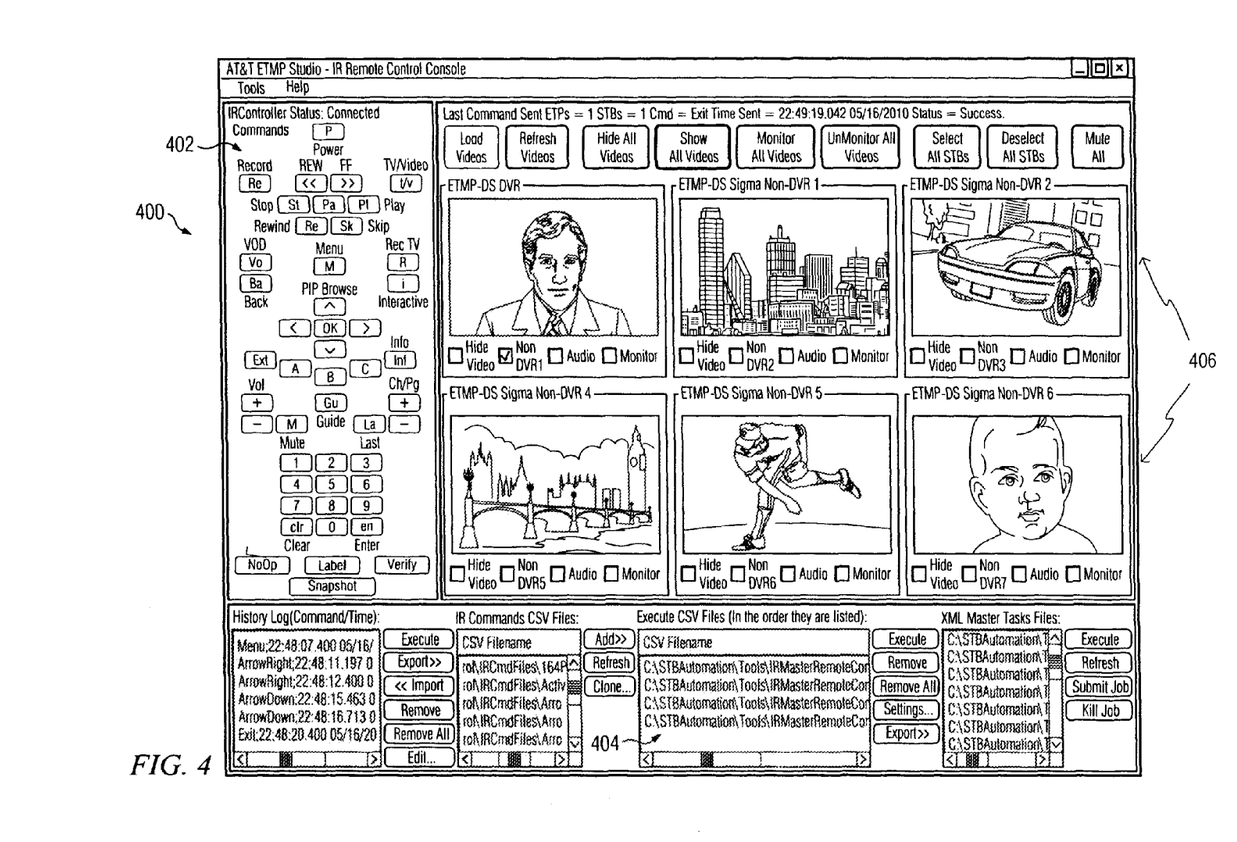
FIG. 4 is a block diagram of selected elements of an embodiment of a video asset.
Figure 7:
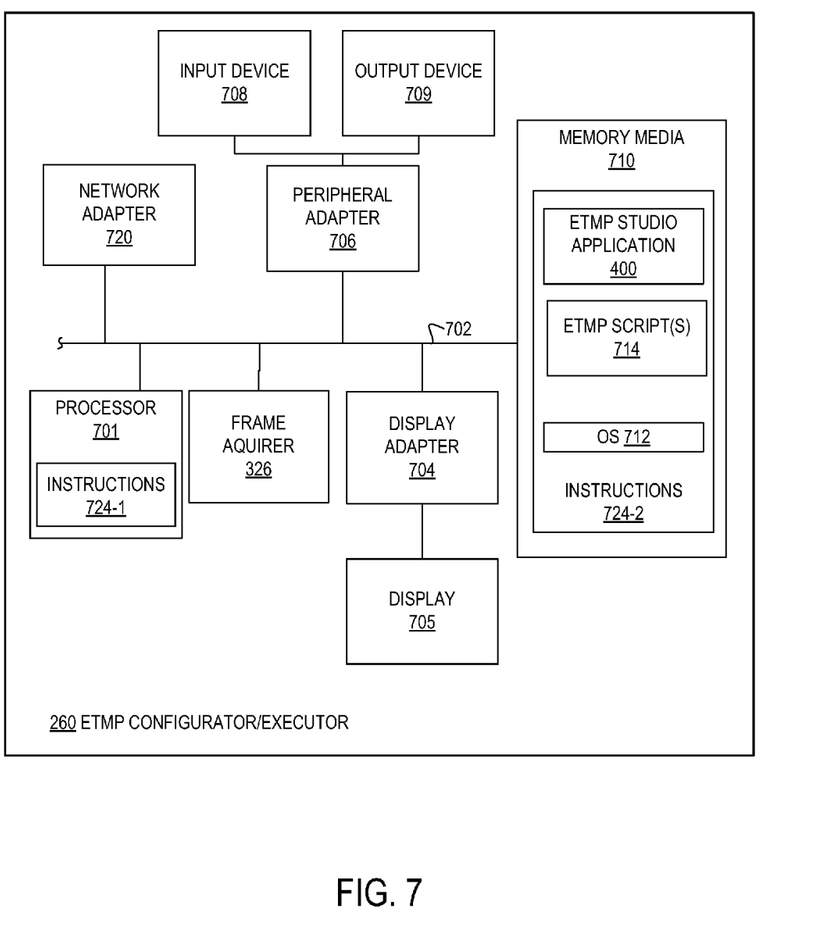
FIG. 7 is a block diagram of selected elements of an embodiment of an ETMP configurator/executor.

In operation of ETMP 170, a user may access ETMP configurator/executor 260-1 to perform test operations on UUT 220-1 (see also ETMP studio application 400 in FIGS. 4, 7). The user may first send a control request to ETMP master controller 232 for access to UUT 220-1. After the control request has been approved and access to UUT 220-1 has been assigned to ETMP configurator/executor 260-1, ETMP configurator/executor 260-1 may query ETMP database 234 for network addresses and configuration information associated with UUT 220-1. Using a queried network address, the user may send a network command using ETMP configurator/executor 260-1 to network-based power control 230 to power up UUT 220-1. ETMP configurator/executor 260-1 may also be used to send a network command to network-based remote control 228 to select a particular video channel for output by UUT 220-1 (i.e., MHD 225-1). ETMP configurator/executor 260-1 may also be used to send a network command to video matrix switch 250 to switch link 254-1 (an output from MHD 225-1) to an input of ETMP configurator/executor 260-1 via link 256-1. The input to ETMP configurator/executor 260-1 may be at frame acquirer 326 (i.e., frame grabber) (see FIGS. 3 and 7), which may be configured to acquire a video and/or audio portion of the selected video channel that has been routed via video matrix switch 250. The acquired audio/video may be used to perform a test operation, which may generate a test result.

During usage of ETMP 170, a user may activate recording of operations performed using ETMP configurator 260. The operations may represent actions taken via a graphical user interface (GUI) of ETMP studio application 400 (see FIGS. 4, 7), such as sending remote control commands to UUT 220. The recorded operations may be stored in ETMP database 234 as an ETMP script (not shown in FIG. 2), that may be retrieved at a later time and executed using ETMP executor 270. After specifying an ETMP script to retrieve, an ETMP user may specify execution parameters for the ETMP script. In certain instances, a number of UUTs 220 executing the ETMP script may be configured with identical execution parameters. Certain UUTs 220 may be configured with individual execution parameters that are different. The execution parameters may specify a number of iterations to repeat the selected ETMP script, a storage location for recording outcomes of the selected ETMP script, responses to MHD errors occurring during execution of the selected ETMP script, or a combination thereof, among other execution parameters. In particular embodiments, the execution parameters themselves may be stored along with, or separate from, the ETMP script, as desired.

Execution of the ETMP script may then involve sending corresponding remote control commands to UUT 220. It is noted that the ETMP script may be globally addressable to any instance of UUT 220. As will be described in further detail below, the ETMP script may be automatically executed substantially simultaneously on a selectable plurality of UUTs 220. The ETMP script may be repeated for a number of iterations on the plurality of UUTs 220.

When a device or component of UUT 220 fails (i.e., becomes erroneous) during execution of the ETMP script, erroneous UUT 220 may be powered off and then powered on again (i.e., restarted or power cycled) using network-based power control 230. After power on, the ETMP script may again be executed on restarted UUT 220. In certain embodiments, a previous operational state of UUT 220 prior to restarting may be automatically recreated, such that the ETMP script may be resumed at an instruction where the previous failure occurred. In other embodiments, the ETMP script itself may be restarted after UUT 220 is power cycled.

During execution of an ETMP script, results of the ETMP script may be recorded. The results may be recorded for each individual UUT 220 that is executing the ETMP script. The results of the ETMP script may include multimedia output presented by one or more MHDs, including at least one of: an MCDN program channel, a VOD program, a PPV program, a previously recorded program, Internet content, an MCDN user logon screen, an EPG screen, a program information screen, a VOD menu screen, and a PPV menu screen. The results of the ETMP script may further include statistics for different iterations of the retrieved ETMP script, statistics for different UUTs 220 executing the retrieved ETMP script, errors reported by UUTs 220 executing the retrieved ETMP script, status indications for UUTs 220 executing the retrieved ETMP script, and performance indications for UUTs 220 executing the retrieved ETMP script.

It is further noted that different ETMP users may create, store, and retrieve ETMP scripts. ETMP user access may depend on a user's authorization, which may be validated before access to a given ETMP script is granted. In this manner, redundancy among various ETMP scripts generated and efficient sharing of workload may be securely accomplished among users of ETMP 170.

Referring now to FIG. 3, a block diagram illustrating selected elements of an embodiment of UUT 220, including further details of MHD 225, is presented. UUT 220 may be configured to execute remote control commands associated with ETMP test scripts, as mentioned above. In FIG. 3, MHD 225 is shown as a functional component of UUT 220 along with GW 223, which is shown receiving multimedia content 360 from switching network 140. It is noted that UUT 220 may represent functionality similar to that provided to clients 120 and, in particular, may receive substantially the same multimedia content 360 as received by clients 120 (see FIG. 1). In this manner, UUT 220 may serve as a realistic and accurate representation of clients 120 within ETMP 170 for testing and monitoring purposes, as described herein.

In the embodiment depicted in FIG. 3, MHD 225 includes processor 301 coupled via shared bus 302 to storage media, collectively identified as memory media 310. MHD 225, as depicted in FIG. 3, further includes network adapter 320 that interfaces MHD 225 to switching network 140 via GW 223 and through which MHD 225 receives multimedia content 360. GW 223 is shown providing a bridge to switching network 140, and receiving multimedia content 360 from switching network 140.

In embodiments suitable for use in IP-based content delivery networks, MHD 225, as depicted in FIG. 3, may include transport unit 330 that assembles the payloads from a sequence or set of network packets into a stream of multimedia content. In coaxial-based access networks, content may be delivered as a stream that is not packet-based and it may not be necessary in these embodiments to include transport unit 330. In a co-axial implementation, however, other tuning resources (not explicitly depicted in FIG. 3) may be used to "filter" desired content from other content that is delivered over the coaxial medium simultaneously and these tuners may be provided in MHD 225. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce video and audio signals 352 and 354 in a format compliant with a display, as mentioned previously. Since MHD 225 is configured for test monitoring within ETMP 170, a display may be omitted from UUT 220. Video and audio signals 352 and 354, which may be referred in aggregate to as the "baseband video signal," may represent analog signals, digital signals, or a combination thereof, in different embodiments. In FIG. 3, video and audio signals 352 and 354 are shown being ultimately routed to frame acquirer 326 (see also FIG. 7), which, as shown in the exemplary embodiment of FIG. 3, is included in an instance of ETMP configurator 260. The routing of video and audio signals 352 and 354 may be accomplished using video matrix switch 250 (see FIG. 2), as described above. Specifically, output signals from MHD 225 may be carried via link 254 to video matrix switch 250 (not shown in FIG. 3, see FIG. 2), which may then further route the signals via link 256 to a desired instance of frame acquirer 326. It is noted that frame acquirer 326 may be configured with multiple input channels or ports for simultaneously receiving signals from a plurality of different video sources, such as different MHDs 225.

Memory media 310 encompasses persistent and volatile media, fixed and removable media, and magnetic and semiconductor media. Memory media 310 is operable to store instructions, data, or both. Memory media 310 as shown may include sets or sequences of instructions and/or data, namely, an operating system 312, EPG 316, and MCDN application 318. Operating system 312 may be a UNIX or UNIX-like operating system, a Windows® family operating system, or another suitable operating system. In some embodiments, memory media 310 is configured to store and execute instructions provided as services to UUT 220 by application server 150, as mentioned previously. For example, MCDN application 318 may represent a combination of various sources of multimedia content that have been combined and generated as an output channel by application server 150.

EPG 316 represents a guide to the multimedia content provided to UUT 220 via MCDN 100, and may be output as an element of the user interface. The user interface may include a plurality of menu items arranged according to one or more menu layouts, which enable operation of MHD 225 using a remote control.

Local transceiver 308 represents an interface of MHD 225 for communicating with external devices, such as a remote control or network-based remote control 228 (see FIG. 2). Local transceiver 308 may provide a mechanical interface for coupling to an external device, such as a plug, socket, or other proximal adapter. In some cases, local transceiver 308 is a wireless transceiver, configured to send and receive IR or RF or other signals. In some implementations local transceiver 308 receives IR or RF signals, but does not transmit IR or RF signals, i.e., local transceiver 308 may be a receiver. Local transceiver 308 may be accessed by a remote control module (not shown in FIG. 3) for providing remote control functionality. In some embodiments, local transceiver 308 may include WiFi functionality.

Turning now to FIG. 4, a block diagram of selected elements of an embodiment of ETMP studio application 400 (see also FIG. 7) is shown as a GUI screen. ETMP studio application 400 may provide various functionality to a user of ETMP configurator/executor 260 (see FIG. 2), on which ETMP studio application 400 may be executed. In particular, ETMP studio application 400 may be used to perform various operations via remote control commands on UUT 220, and to view corresponding results of an output generated by UUT 220, that may be captured using frame acquirer 326 (see FIGS. 3, 7).

As shown in FIG. 4, ETMP studio application 400 may include virtual remote control 402, which may represent functionality substantially similar to a physical embodiment of the individual remote control usable with client 120, as described above with respect to FIG. 1. Virtual remote control 402 may receive user input via the GUI screen, and, in response, send corresponding commands to UUT 220 via network-based remote control 228 (see FIG. 2). Since there may be a myriad of commands involved in using ETMP studio application 400 for testing UUT 220, a user of ETMP studio application 400 may desire to capture, or record, a sequence of user input actions to virtual remote control 402. ETMP studio application 400 may accordingly be configured to record user input operations and generate an ETMP script, which may be stored and retrieved for later use. The ETMP script may be generated in a manner that permits global addressing of UUT 220 within ETMP 170, such that any available UUT 220 may be used with any ETMP script. ETMP studio application 400 may further be configured to provide functionality to allow users to load, modify, edit, delete, rename, or combine at least certain portions of ETMP scripts, among other operations. In certain embodiments, ETMP scripts may be stored by ETMP studio application 400 using ETMP database 234 (see FIG. 2).

Also shown in FIG. 4 included in the GUI screen of ETMP studio application 400 is ETMP script display 404, which may store indications of ETMP scripts, or portions thereof. For example, ETMP script display 404 may display filenames of particular ETMP scripts, which may be accessible by the ETMP user. ETMP studio application 400 may provide functionality to manually execute ETMP scripts (or portions thereof) to enable interactive testing and monitoring of MHD multimedia output. The MHD multimedia output may be displayed in the GUI screen of ETMP studio application 400 at ETMP video display 406, which may receive video data for one or more MHDs 225 via frame acquirer 326. Thus, ETMP studio application 400 may simultaneously display video output from different MHDs 225 using ETMP video display 406. As will be discussed in further detail, ETMP scripts may also be automatically executed or be scheduled for automatic execution at a specified start time. It is noted that automatic execution of ETMP scripts may be performed with ETMP configurator/executor 260 and/or ETMP executor 270.

Figure 5:
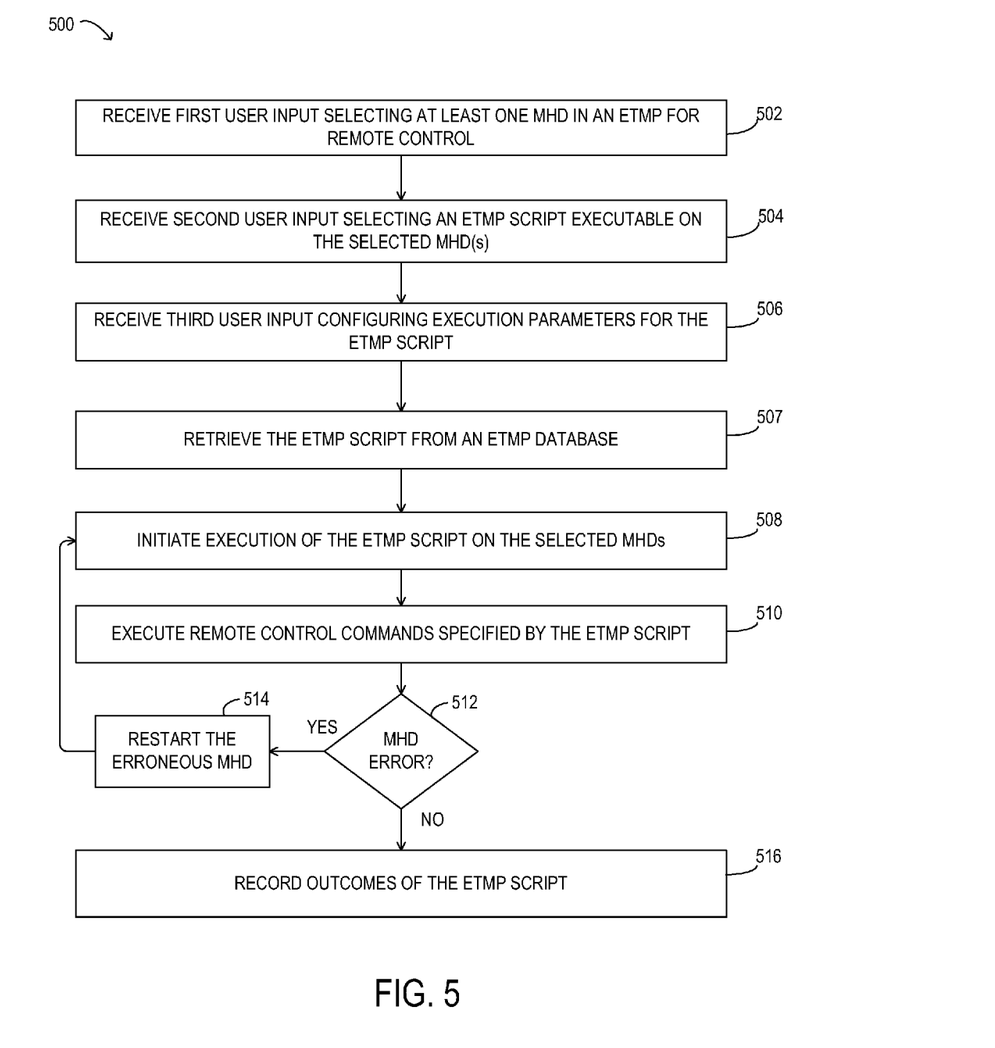
FIG. 5 illustrates selected elements of an embodiment of an MCDN test monitoring method.

Turning now to FIG. 5, selected elements of an embodiment of a method 500 for monitoring of MCDN output channels is illustrated in flow chart form. In one embodiment, method 500 may be performed by ETMP 170 (see FIGS. 1, 2). In particular, method 500 may represent an example of executing an ETMP script using ETMP studio application 400 (see FIG. 4). It is noted that certain operations described in method 500 may be optional or may be rearranged in different embodiments.

In method 500, first user input may be received (operation 502) for selecting at least one MHD in an ETMP for remote control. The MHD may be one of a plurality of UUTs configured for use in the ETMP. In response to receiving the first user input, the selected MHD may be assigned to the user for performing testing operations. Then, second user input may be received (operation 504) for selecting an ETMP script executable on the selected MHD(s). The second user input may represent selection of an ETMP script for retrieval from ETMP database 234 or another data store. In particular embodiments, operation 504 includes identifying a user requesting the ETMP script. After a user identity for the requesting user is determined, the user identity may be used to validate that the user identity is authorized to access the ETMP script. In this manner, the user may be validated as being authorized to access the ETMP script. It is noted that in certain embodiments, a different ETMP script may be selected in operation 504 for at least one MHD selected in operation 502. Next in exemplary method 500, third user input may be received (operation 506) for configuring execution parameters for the ETMP script. It is noted that in certain embodiments, operation 506 may be optional. The execution parameters may describe how ETMP 170 should process or execute the ETMP script. Thus, the execution parameters may generally describe operational attributes applicable to one or more ETMP scripts, as described previously with respect to FIG. 2. The ETMP script may be retrieved (operation 507) from an ETMP database. Execution of the ETMP script may be initiated (operation 508) on the selected MHDs. The ETMP script may be executed according to the execution parameters specified in operation 506. It is noted that operation 508 may be performed in response to additional user input either manually or automatically. Manual performance of operation 508 may simply involve receiving specific user input for immediately starting the ETMP script. In an example of automatic performance, operation 508 may be scheduled in advance to be performed at a specified start time, such that method 500 remains suspended after operation 507 (or at another desired operation) until the start time occurs. When the scheduled start time occurs, method 500 may proceed automatically. The start time may be specified by user input. It is noted that ETMP 170 may be configured to simultaneously handle and execute a plurality of ETMP scripts, which may be manually or automatically executed. In various embodiments, ETMP master controller 232 may be configured to handle execution of ETMP scripts. Remote control commands specified by the ETMP script may then be executed (operation 510). Operation 510 may involve sending remote control commands to a plurality of MHDs 225 substantially simultaneously. The remote control commands may cause MHD 225 to output certain multimedia output, as described previously in detail with respect to FIG. 2.

Next in method 500, a determination may be made whether an MHD error has occurred (operation 512). The determination in operation 512 may be made based on explicit results received from an MHD, or based on another indication, such as on a time period of inactivity at an MHD. When the result of operation 512 is YES, the erroneous MHD may be restarted (operation 514). In certain embodiments, operation 514 may be omitted, for example, when an error occurs that involves restarting the ETMP script but not restarting MHD 225. After operation 514, method 500 may then loop to operation 508 to again execute the ETMP script. In this manner, method 500 may provide for long-term execution of ETMP scripts, even when various types of hardware and/or software failures occur. When the result of operation 512 is NO, outcomes of the ETMP script may be recorded (operation 516). As noted above with respect to FIG. 2, the outcome of the ETMP script may be a representation of the multimedia content output by MHD 225 and/or a result of a remote control command or MHD command specified in the ETMP script. Statistical information associated with an outcome of the ETMP script may also be recorded in operation 516. It is noted that ETMP database 234 (see FIG. 2), or another data store, may be configured to store and retrieve outcomes and/or results of ETMP scripts.

Figure 6:
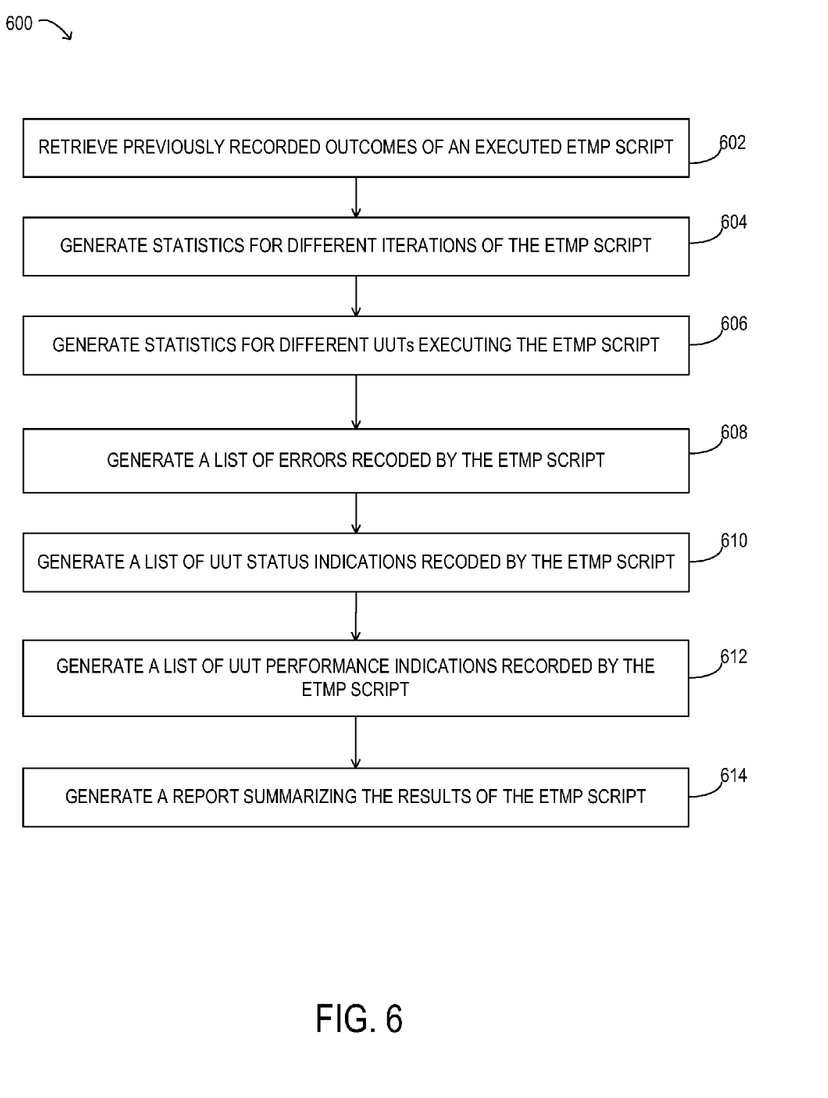
FIG. 6 illustrates selected elements of an embodiment of an MCDN test monitoring method.

Turning now to FIG. 6, selected elements of an embodiment of method 600 for reporting results of ETMP scripts are illustrated in flow chart form. In one embodiment, method 600 may be performed by ETMP 170 (see FIGS. 1, 2). In particular, method 600 may represent an example of analyzing results of an executed ETMP script using ETMP studio application 400 (see FIG. 4). It is noted that certain operations described in method 600 may be optional or may be rearranged in different embodiments.

Method 600 may begin by retrieving (operation 602) previously recorded outcomes of an executed ETMP script. The ETMP script may have been executed on a plurality of UUTs 220 over a number of iterations. Statistics may be generated (operation 604) for different iterations of the ETMP script. Statistics may be generated (operation 606) for different UUTs executing the ETMP script. A list of errors recorded by the ETMP script may be generated (operation 608). The errors may include MHD errors reported by MHD 225 in response to receiving an MHD command. The errors may include GW errors reported by GW 223 in response to receiving a remote control command for MHD 225. A list of UUT status indications recorded by the ETMP script may be generated (operation 610). The UUT status indications may include MHD status messages, or GW status messages, received in response to sending a remote control command to UUT 220. A list of UUT performance indications recorded by the ETMP script may be generated (operation 612). The UUT performance indications may include MHD performance messages, or GW performance messages, received in response to sending a remote control command to UUT 220. The errors, UUT status indications, and/or UUT performance indications may have been recorded in response to results, or responses to remote control commands, generated by UUT 220 when the ETMP script was executed. Then, a report summarizing the results of the ETMP script may be generated (operation 614). The ETMP report may be sent to a desired entity, for example, by specifying a recipient network address. The report may include statistical information generated in method 600.

Referring now to FIG. 7, a block diagram illustrating selected elements of an embodiment of ETMP configurator/executor 260 is presented (see also FIG. 2). As shown in FIG. 2, multiple instances of ETMP configurator/executor 260 may be configured for use in conjunction with a given ETMP 170 facility. The elements of ETMP configurator/executor 260 depicted in FIG. 7 may be physically implemented as a single, self-contained device. In certain implementations, ETMP configurator/executor 260 may alternatively be implemented using a number of different devices that are physically separated, but coupled together for centralized control. It is noted that ETMP configurator/executor 260 may include additional components, such as a power supply and a cooling element, which have been omitted from FIG. 7 for clarity. As shown in FIG. 7, ETMP configurator/executor 260 may operate in conjunction with ETMP 170 (see also FIGS. 1 and 3) to execute the methods and operations described herein. It is also noted that ETMP executor 270 may be similarly configured to ETMP configurator/executor 260 for executing at least some of the methods described herein. In certain embodiments, ETMP configurator/executor 260 may represent a virtualized computing environment, wherein certain elements depicted in FIG. 7 are shared or represent virtualized components.

In the embodiment depicted in FIG. 7, ETMP configurator/executor 260 includes processor 701 coupled via shared bus 702 to storage media collectively identified as memory media 710. ETMP configurator/executor 260, as depicted in FIG. 7, further includes network adapter 720 that interfaces ETMP configurator/executor 260 to a network (not shown in FIG. 7), such as ETMP network 240 (see FIG. 2). In embodiments suitable for use with ETMP 170, ETMP configurator/executor 260, as depicted in FIG. 7, may include peripheral adapter 706, which provides connectivity for the use of input device 708 and output device 709. Input device 708 may represent a device for user input, such as a keyboard or a mouse, or even a video camera. Output device 709 may represent a device for providing signals or indications to a user, such as loudspeakers for generating audio signals.

ETMP configurator/executor 260 is shown in FIG. 7 including display adapter 704 and further includes a display device or, more simply, a display 705. Display adapter 704 may interface shared bus 702, or another bus, with an output port for one or more displays, such as display 705. Display 705 may be implemented as a liquid crystal display screen, a computer monitor, a TV or the like. Display 705 may comply with a display standard for computer monitors and/or TV displays. Standards for computer monitors include analog standards such as VGA, XGA, etc., or digital standards such as DVI and HDMI, among others. A TV display may comply with standards such as NTSC, PAL, or another suitable standard. Display 705 may include one or more integrated speakers to play audio content.

Memory media 710 encompasses persistent and volatile media, fixed and removable media, and magnetic and semiconductor media. Memory media 710 is operable to store instructions, data, or both. Memory media 710 as shown includes sets or sequences of instructions 724-2, namely, an operating system 712, ETMP script(s) 714, and ETMP studio application 400. Operating system 712 may be a UNIX or UNIX-like operating system, a Windows® family operating system, or another suitable operating system. Instructions 724 may also reside, completely or at least partially, within processor 701 during execution thereof. It is further noted that processor 701 may be configured to receive instructions 724-1 from instructions 724-2 via shared bus 702. ETMP script(s) 714 may represent a sequence of test operations generated by user input to ETMP studio application 400, as described previously. ETMP script(s) 714 may be generated using ETMP studio application 400, which may provide ETMP configurator functionality. ETMP script(s) 714 may also be executed using ETMP executor functionality. As noted above, ETMP script(s) 714 may be retrieved from ETMP database 234 (see FIG. 2) or another data store.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A monitoring method, comprising:
   selecting, from a plurality of multimedia handling devices, via a test platform network, a multimedia handling device as a unit under test, wherein each of the plurality of multimedia handling devices is:
   accessible via the test platform network; and
   configured to receive multimedia content from a multimedia content distribution network;
   selecting a test script comprising a plurality of test operations wherein test operations control the unit under test via the test platform network;
   indicating a value for a test execution parameter associated with the test script;
   executing the test script according to the test execution parameter;
   sending a power control command to a test platform network power controller, to control power supplied to the multimedia handling devices; and
   sending a video switch command to a test platform video matrix switch to switch a baseband signal output by the unit under test to any one or more of a plurality of frame acquisition inputs.

2. The method of claim 1, wherein the test execution parameter is selected from: a number of iterations to repeat the test script, a storage location for recording outcomes of the test script, and responses to device errors occurring during execution of the test script.

3. The method of claim 2, wherein the responses to device errors include a reset response, the method further comprising:
   selectively restarting an erroneous unit under test using a test platform network power controller to cycle power off and on to the erroneous unit under test.

4. The method of claim 1, wherein:
   indicating a value for a text execution parameter includes indicating values for a plurality of test execution parameters; and
   the plurality of test execution parameter includes:
   a first test execution parameter for a first unit under test; and
   a second test execution parameter for a second unit under test;
   wherein the first test execution parameter differs from the second execution parameter.

5. The method of claim 1, wherein the test operations include remote control operations to control the unit under test via a test platform network remote control.

6. The method of claim 1, wherein the executing of the test script occurs at a scheduled start time.

7. The method of claim 1, further comprising:
   retrieving the test script from a test platform database.

8. A computer readable memory including processor executable instructions that, when executed by a processor, cause the processor to perform operations, comprising:
   selecting, as a unit under test, a set top box selected from a plurality of set top boxes, wherein each of the set top boxes is:
   accessible via a test platform network; and
   configured to:
      receive multimedia content from a multimedia content distribution network; and
      output multimedia content distribution network channels;
   accessing a test script associated with the test platform, wherein the test script includes test platform remote control commands executable by a test platform network remote controller to send remote control commands to the unit under test;
   specifying a test execution parameter associated with the test script;
   executing the test script according to the test execution parameter; and sending a video switch command to a test platform video matrix switch to switch a baseband signal output by the unit under test to any one or more of a plurality of frame acquisition inputs.

9. The computer readable memory of claim 8, wherein the test execution parameter indicates execution information selected from: a number of iterations to repeat the test script, a storage location for recording results of the test script, and responses to unit under test errors occurring during execution of the test script.

10. The computer readable memory of claim 9, wherein the operations include:
selecting a plurality of the multimedia handling devices as units under test;
recording results of executing the test script; and
generating a report based on the recorded results, the report including information selected from: statistics for different iterations of the test script, statistics for any unit under test errors, status indications for the units under test, and performance indications for the units under test.

11. The computer readable memory of claim 10, wherein the operations include:
receiving user input indicating:
a first execution parameter for a first unit under test; and
a second execution parameter for a second unit under test;
wherein the first execution parameter differs from the second execution parameter.

12. The computer readable memory of claim 9, wherein the responses to units under test errors include a reset response, wherein the operations include:
selectively restarting an erroneous unit under test via a test platform network controller to cycle power off and on to the erroneous unit under test.

13. The computer readable memory of claim 8, wherein the operations include:
identifying a user associated with the test script; and
validating the user as authorized to access the test script.

14. The computer readable memory of claim 8, wherein the remote control commands cause the unit under test to present multimedia output, the multimedia output selected from: a multimedia content delivery network program channel, a video-on-demand (VOD) program, a pay-per-view (PPV) program, a previously recorded program, Internet content, a multimedia content delivery network user logon screen, an electronic program guide screen, a program information screen, a VOD menu screen, and a PPV menu screen.

15. A monitoring system, comprising:
a processor; and
a computer readable storage medium accessible to the processor and including processor executable instructions that, when executed by the processor, cause the processor to perform operations comprising:
selecting, from a plurality of multimedia handling devices, via a test platform network, a multimedia handling device as a unit under test, wherein each of the plurality of multimedia handling devices is:
accessible via the test platform network; and
configured to receive multimedia content from a multimedia content distribution network;
accessing a test script associated with the test platform network, wherein the test script includes test platform remote control commands executable by a test platform network remote controller to send remote control commands to the unit under test;
specifying a test execution parameter associated with the test script; and
executing the test script according to the test execution parameter;
a test platform network power controller for controlling power supplied to the multimedia handling devices in response to receiving a power control command;
a test platform remote control for indicating a multimedia content distribution network channel in response to receiving a channel selection command; and
a test platform video matrix switch, wherein the video matrix switch, in response to receiving a video switch command, selectively switches a baseband signal output by the unit under test to any one or more of a plurality of frame acquisition inputs.

16. The system of claim 15, wherein the operations include:
identifying a user requesting the test script; and
validating the user as authorized to access the test script.

17. The system of claim 15, wherein specifying the test execution parameter comprises performing an operation selected from: indicating a number of iterations for executing the test script, indicating a storage location for recording output from the unit under test, and indicating responses to unit under test errors.

18. The system of claim 17, wherein the operations include:
receiving input indicating a scheduled start time for the test script; and
wherein executing the test script occurs at the scheduled start time.

19. The system of claim 17, wherein the operations include:
recording a sequence of user executed test operations as the test script;
storing the test script to a test script database; and
retrieving the test script from the test script database.

* * * * *